US007610483B2

(12) United States Patent
Currid et al.

(10) Patent No.: US 7,610,483 B2
(45) Date of Patent: Oct. 27, 2009

(54) SYSTEM AND METHOD TO ACCELERATE IDENTIFICATION OF HARDWARE PLATFORM CLASSES

(75) Inventors: Andrew Currid, Alameda, CA (US); Mark A. Overby, Bothell, WA (US)

(73) Assignee: NVIDIA Corporation, Santa Clara, CA (US)

( * ) Notice: Subject to any disclaimer, the term of this patent is extended or adjusted under 35 U.S.C. 154(b) by 433 days.

(21) Appl. No.: 11/459,871

(22) Filed: Jul. 25, 2006

(65) Prior Publication Data

US 2008/0043000 A1  Feb. 21, 2008

(51) Int. Cl.
G06F 9/00 (2006.01)
G06F 1/24 (2006.01)
G06F 13/00 (2006.01)
G06F 12/00 (2006.01)

(52) U.S. Cl. ................ 713/100; 713/1; 713/2; 710/104; 711/216

(58) Field of Classification Search .......... 713/100, 713/1; 710/104; 711/216
See application file for complete search history.

(56) References Cited

U.S. PATENT DOCUMENTS

| 5,671,355 | A  | * | 9/1997  | Collins ............... 709/250 |
| 6,519,698 | B1 | * | 2/2003  | Leyda et al. ............ 713/2 |
| 6,598,159 | B1 |   | 7/2003  | McAlister et al. |
| 7,062,550 | B1 |   | 6/2006  | Hutchinson et al. |
| 7,266,679 | B2 | * | 9/2007  | Martinez ............... 713/100 |
| 7,360,072 | B1 |   | 4/2008  | Soltis et al. |
| 7,363,514 | B1 |   | 4/2008  | Behren |
| 7,373,514 | B2 | * | 5/2008  | Krueger et al. ........... 713/181 |
| 2001/0052069 | A1 |   | 12/2001 | Sekiguchi |
| 2002/0073186 | A1 |   | 6/2002  | French et al. |
| 2002/0161832 | A1 | * | 10/2002 | Brebner ................. 709/203 |
| 2003/0065913 | A1 |   | 4/2003  | Cepulis et al. |
| 2004/0019796 | A1 |   | 1/2004  | Wang |
| 2005/0228950 | A1 |   | 10/2005 | Karr |
| 2005/0251641 | A1 | * | 11/2005 | Camilli et al. ............. 711/170 |
| 2006/0069949 | A1 | * | 3/2006  | Hayakawa et al. ........... 714/12 |
| 2006/0155838 | A1 |   | 7/2006  | Wu et al. |
| 2007/0074290 | A1 |   | 3/2007  | Kobayashi et al. |
| 2007/0157051 | A1 | * | 7/2007  | Hernandez et al. ........... 714/1 |

OTHER PUBLICATIONS

Final Office Action. U.S. Appl. No. 11/459,850. Dated Jun. 26, 2009.
Office Action. U.S. Appl. No. 11/459,892. Dated Jul. 7, 2009.

\* cited by examiner

*Primary Examiner*—Thomas Lee
*Assistant Examiner*—Stefan Stoynov
(74) *Attorney, Agent, or Firm*—Patterson & Sheridan, LLP

(57) ABSTRACT

One embodiment of the present invention sets forth a technique for concisely identifying the hardware configuration of a computer system through a single signature value. This signature value is computed by passing specific hardware configuration information through a hashing function. The hardware configuration information may include, among other things, selected elements of the SMBIOS system description as well as PCI topology and PCI bus type information.

18 Claims, 3 Drawing Sheets

SYSTEM AND METHOD TO ACCELERATE IDENTIFICATION OF HARDWARE PLATFORM CLASSES

BACKGROUND OF THE INVENTION

1. Field of the Invention

Embodiments of the present invention relate generally to identifying computer system configurations and more specifically to a system and method to accelerate identification of hardware platform classes.

2. Description of the Related Art

A typical modern x86-based computer system may include a number of different hardware components from various component manufacturers. The components may be configured in a particular bus and input/output architecture suitable to the needs of the computer system. For example, such a system may include, without limitation, one or more graphics processors, one or more network interface controllers (NICs), one or more CPUs, various possible bus structures to accommodate a certain number and mix of bus interfaces such as PCI™ or PCI-express™, a certain amount of installed memory, zero or more hard disks and zero or more optical storage media drives, each from a particular manufacturer. The bus architecture is selected at the time of manufacture and is typically fixed for a particular system. However, each component or version of component may be opportunistically selected by the manufacturer and used in a particular model of computer system to minimize cost or fix bugs discovered after a manufacturing ramp that used older parts. In some cases, a particular model of computer system may offer various speed grades of CPU. To complicate matters, various components may be removed, replaced or added by the user.

Identifying a specific computer system as being a member of a particular class of hardware platform is useful for any number of purposes such as, for example, asset management and system management automation. The current art of identifying a specific computer system hardware platform is based on an enumerated list of specifications and features associated with the hardware platform. To determine if a given computer system is part of a particular class of hardware platform, the specifications and features of the computer system are compared to the enumerated list defining the class of hardware platform. The process of classifying a computer system is typically conducted manually and consumes substantial labor time and expense because the amount of data necessary to describe a particular system is rather extensive and unwieldy. An example scenario where a number of computer systems are manually classified is a computer system deployment involving a mix of different types and versions of diskless computing devices. In such a scenario, each diskless computing device is manually classified and manually associated with one of potentially many different boot images on a boot server, where the boot server includes a unique boot image for each class of hardware platform. Again, such a scenario is time consuming and expensive. Further, such a scenario is prone to human error.

As the foregoing illustrates, what is needed in the art is a more efficient way to classify computer systems having different hardware configurations.

SUMMARY OF THE INVENTION

One embodiment of the invention sets forth a method for uniquely identifying a hardware configuration of a computer system. The method includes the steps of gathering data from a system management basic input-output system (SMBIOS) device list generated for the computer system, probing a bus within the computer system to determine a bus topology and to assign a unique identifier to each device coupled to the bus, accessing configuration space registers of each device coupled to the bus to determine a bus type, and computing a signature value for the computer system based on at least the data gathered from the SMBIOS device list and the bus type.

One advantage of the disclosed method is that it provides a technique for concisely identifying the hardware configuration of a computer system through a single signature value.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
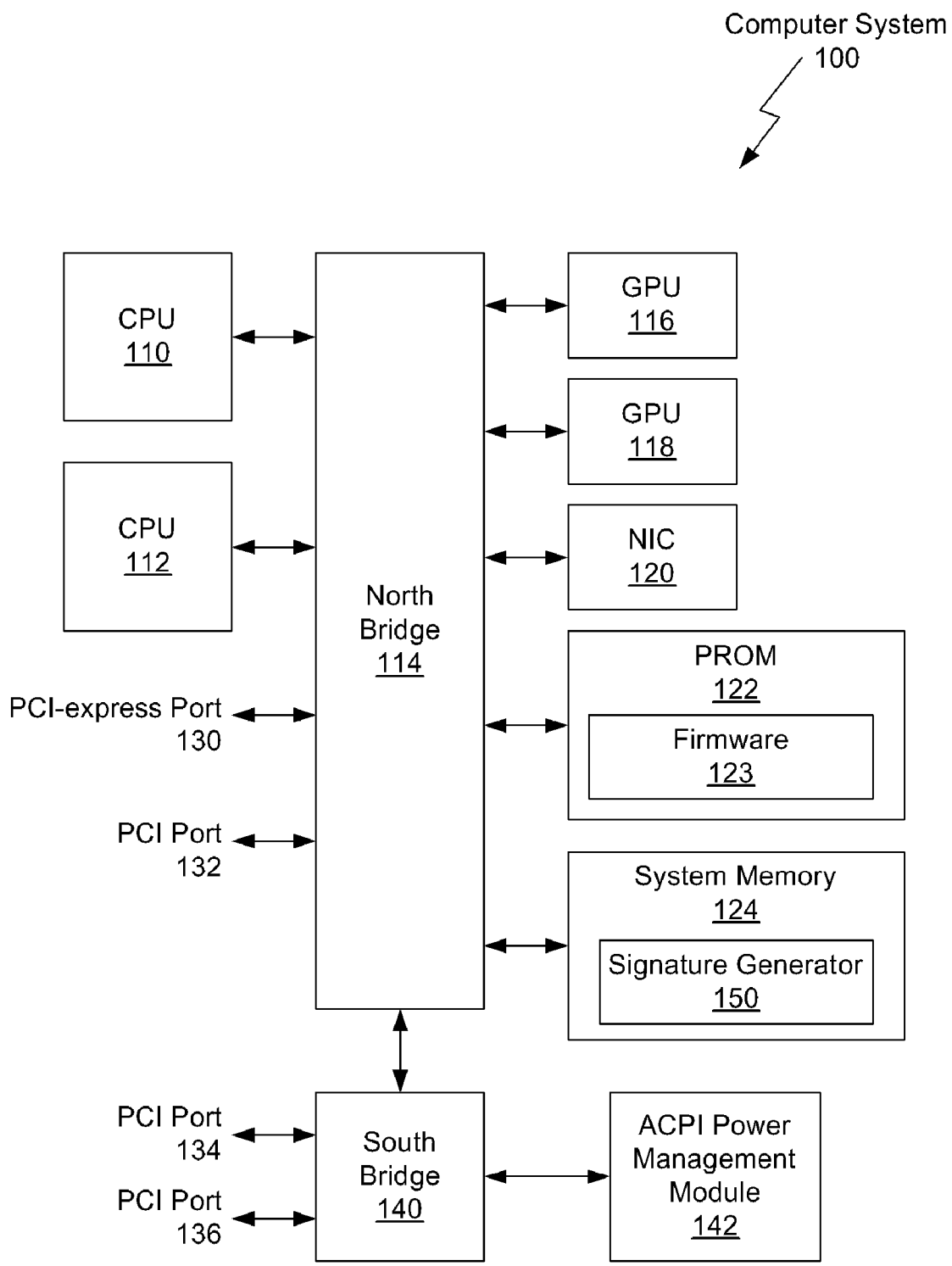
FIG. 1 is a conceptual diagram of a computer system that includes various system components, according to one embodiment of the invention.

FIG. 1 is a conceptual diagram of a computer system 100 that includes various system components, according to one embodiment of the invention. As shown, the computer system 100 includes, without limitation, a North Bridge 114 used to interconnect multiple high-bandwidth devices, such as a CPU 110, a system memory 124, and in certain cases, a second CPU 112. The North Bridge 114 includes a memory controller and arbiter that manages the memory requests posted by the various connected devices. Typical configurations of the computer system 100 also include a GPU 116 connected to the North Bridge 114. In certain instances, a second GPU 118 may also connect to the North Bridge 114 to provide additional features or higher performance than a single GPU system. One or more expansion ports, such as a PCI-express port 130 or a standard PCI port 132, may be present on the North Bridge 114. The GPUs 116 and 118 typically connect to the North Bridge 114 via one of several available PCI-express ports. A NIC 120 may be connected to the North Bridge 114, or, alternately, to a South Bridge 140. In both cases, the NIC 120 provides the computer system 100 with networking capability. A Programmable Read Only Memory (PROM) 122 is attached to the North Bridge 114, and provides non-volatile storage of firmware 123. The firmware 123 includes, without limitation, procedures to boot the system. In alternate embodiments, the PROM 122 storing the firmware 123 may be attached to the South Bridge 140. A signature generator 150, described in greater detail below, executes as a software module in the system memory 124 to generate a unique signature value that indicates the hardware configuration of the computer system 100. The signature generator 150 may be loaded from the firmware 123 contained in PROM 122 to system memory 124 for execution. In an alternate embodiment, the signature generator 150 may execute in-place within the firmware 123 image residing in PROM 122.

The South Bridge 140 typically provides lower speed expansion interfaces, such as 32-bit PCI ports 134 and 136. The South Bridge 140 also provides a wide variety of common lower speed ports such as USB, keyboard and mouse interfaces (not shown). The South Bridge 140 typically includes common system functionality and implements the advanced configuration power interface (ACPI) power management standard in an ACPI power management module 142.

Many different commodity hardware components may be used to build the hardware infrastructure of the computer system 100. For example, the CPUs 110 and 112 may be chosen from various generations and from available speed grades. Likewise, the GPUs 116 and 118 may be selected from various generations and from more than one product family. To facilitate an industry-wide mechanism that provides uniform hardware configuration discovery of computer systems, the Distributed Management Task Force defined a specification for standardizing hardware configuration discovery, referred to as the system management BIOS (SMBIOS). The SMBIOS specification is well-known in the art and well adopted among x86 computer system manufacturers. The SMBIOS is implemented as a module in firmware 123 that may be used to provide a listing of all hardware devices that reside within a given computer system. However, since the SMBIOS device list does not include PCI bus topology, numbering or type information, the SMBIOS may be used to provide only a partial description of the hardware configuration of a computer system.

Figure 2:
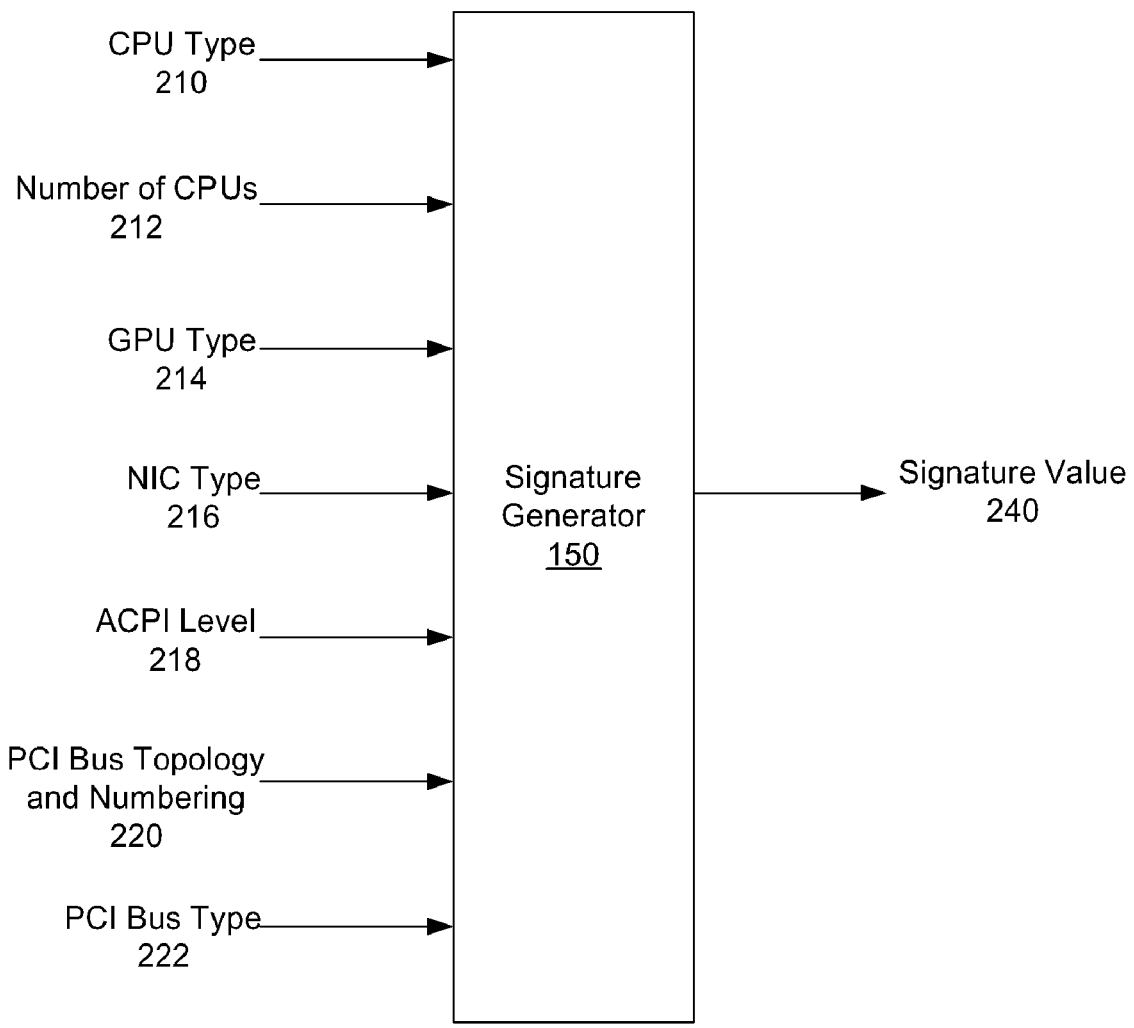
FIG. 2 illustrates the flow of collected configuration data through a signature generator, resulting in a signature value for a computer system, according to one embodiment of the invention.

FIG. 2 illustrates the flow of collected configuration data 210-222 through a signature generator 150, resulting in a signature value 240 for a computer system, according to one embodiment of the invention. A signature value 240 is a unique, relatively short number that indicates the hardware configuration of a given computer system. Importantly, different computer systems that have functionally equivalent hardware configurations have the same signature value. Thus, computer systems that share the same signature value are members of a class of functionally equivalent hardware configurations or platforms. Each such equivalence class may have an arbitrarily large number of members, and computer systems within the same equivalence class operate identically with respect to driver and operating system requirements. Conversely, computer systems outside of a particular equivalence class are not guaranteed to operate identically and may require different or additional drivers.

In order to compute a signature value that captures all of the significant hardware components of the computer system 100 necessary to establish meaningful membership in an equivalence class, information about certain components included in the SMBIOS device list, previously described herein, as well as information about the PCI bus configuration of the computer system 100 may be considered. In one embodiment, the specific subset of data used from the SMBIOS device list to compute the signature value 240 includes the CPU type 210, the number of CPUs 212, the GPU Type 214, the NIC Type 216 and the ACPI level 218. Information related to the PCI bus configuration used to compute the signature value 240 may be determined by probing the PCI bus subsystem using techniques known in the art. First, the signature generator 150 probes the PCI bus to determine what devices are attached to the PCI bus subsystem and then assigns a number to each such device that uniquely identifies the device. The overall bus topology and assigned numbering is represented by PCI bus topology and numbering 220 of FIG. 2. Second, the signature generator 150 accesses the configuration space registers of each of the attached devices to determine a PCI bus type 222 for the PCI bus. The PCI bus type 222 includes a set of numbers reflecting bus characteristics such as the bus width, the voltage compatibility, the speed compatibility as well as the bus version (e.g., whether the bus is a PCI bus or a PCI Express bus). If there is more than one bus within the bus subsystem, then the probing of the bus topology would indicate the existence of multiple buses, and then the information accessed from the configuration space registers would be used to identify the bus type of each bus.

By combining the data from specially selected entries from the SMBIOS device list with the results of the PCI bus probe, a list of system characteristics may be generated that is sufficient to determine whether a given computer system is a member of a particular equivalence class. In raw form, this list of system characteristics may include many hundreds of bytes of data, making the list difficult to use in automated matching operations. Therefore, to achieve greater efficiency, the list of system characteristics is passed through the signature generator 150, where a suitable hashing function converts the raw data into the signature value 240. Again, the signature value 240 indicates the equivalence class of the computer system 100. The overall process of gathering the data represented in the SMBIOS device list, probing the PCI bus, formatting the collected configuration data, and hashing the data to produce the signature value 240 is managed by the signature generator 150.

Figure 3:
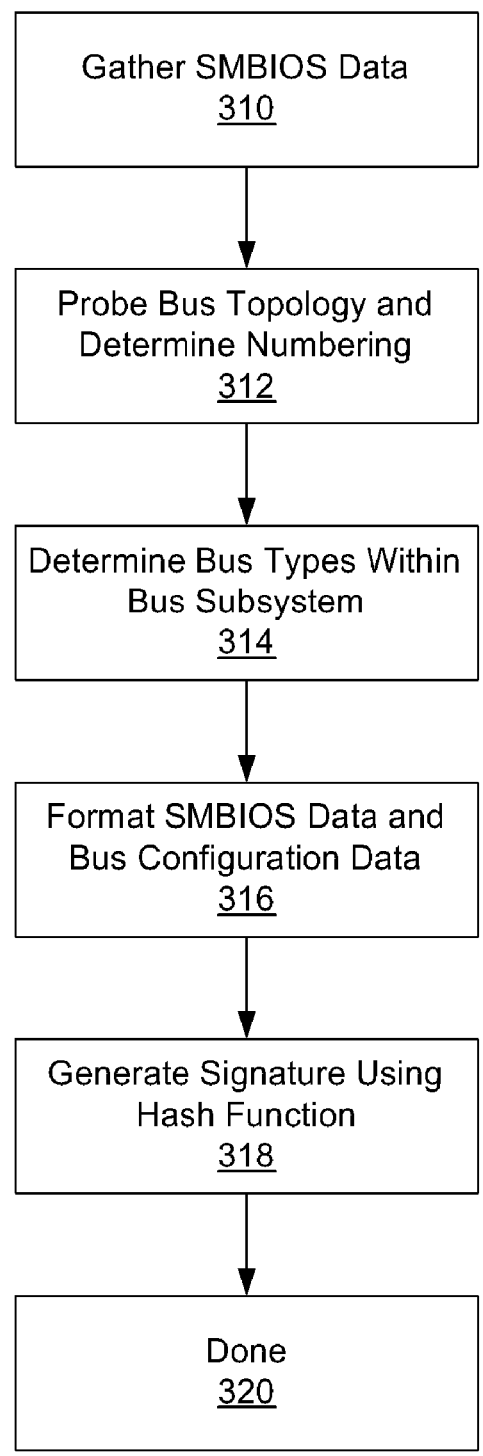
FIG. 3 is a flow diagram of method steps for generating a signature value to represent a particular hardware configuration of a computer system, according to one embodiment of the invention.

FIG. 3 is a flow diagram of method steps for generating a signature value 240 to represent a particular hardware configuration of computer system 100, according to one embodiment of the invention. Although the method steps are described in conjunction with FIGS. 1 and 2, persons skilled in the art will understand that any system that performs the method steps, in any order, is within the scope of the invention.

The method for generating the signature value 240 begins in step 310, where the signature generator 150 gathers data from the SMBIOS device list generated for the computer system 100, such as data elements 210-218 of FIG. 2. In step 312, the signature generator 150 probes the PCI bus to discover the PCI bus topology and to determine numbering 220, as previously described herein. In step 314, the signature generator 150 accesses the configuration space registers of each of the attached devices identified in step 312 to determine each bus type within the bus subsystem. In step 316, the signature generator 150 formats the data from the SMBIOS device list and PCI configuration data for entry into the selected hashing function. In step 318, the signature generator 150 uses the hashing function to generate the signature value 240 for the computer system 100 based on collected data. The method then terminates in step 320.

Modern x86 computer systems include a wide variety of system configurations and are assembled from a wide variety of components, each satisfying a defined functional requirement. By selecting and hashing critical system configuration information, including PCI topology and type information as well as selected data from the SMBIOS device list, signature value may be generated that uniquely identifies the hardware class of a given computer system. The efficiency of this technique is illustrated by comparing a signature value of, for example, 128-bits generated for that computer system using techniques described herein to the hundreds of bytes otherwise needed to identify the hardware configuration of the computer system.

While the forgoing is directed to embodiments of the present invention, other and further embodiments of the invention may be devised without departing from the basic scope thereof. For example, although FIGS. 1-3 describe a computer system that includes PCI-type buses and bus subsystem, the inventive concepts disclosed herein apply with equal force to any type of bus and bus subsystem that may be included in a computer system. Therefore, the scope thereof is determined by the claims that follow.

We claim:

1. A method for uniquely identifying a hardware configuration of a computer system, the method comprising:
   gathering data from a system management basic input-output system (SMBIOS) device list generated for the computer system;
   probing a bus within the computer system to determine a bus topology and to assign a unique identifier to each device coupled to the bus;
   accessing configuration space registers of each device coupled to the bus to determine a bus type; and
   computing a signature value for the computer system based on at least the data gathered from the SMBIOS device list, the bus topology, and the bus type wherein the step of computing the signature value comprises passing the data gathered from the SMBIOS device list, the bus topology, and the bus type through a hash function, and wherein the signature value is smaller in size than the data gathered from the SMBIOS device list, the bus topology, and the bus type.

2. The method of claim 1, wherein the bus type reflects the width of the bus, the voltage compatibility of the bus and the speed compatibility of the bus.

3. The method of claim 2, wherein the bus type further reflects the bus version.

4. The method of claim 1, wherein the data gathered from the SMBIOS device list includes a central processing unit (CPU) type.

5. The method of claim 1, wherein the data gathered from the SMBIOS device list includes the number of CPUs within the computer system.

6. The method of claim 1, wherein the data gathered from the SMBIOS device list includes a graphics processing unit (GPU) type.

7. The method of claim 1, wherein the data gathered from the SMBIOS device list includes a network interface card (NIC) type or an advanced configuration power interface level.

8. The method of claim 1, wherein the bus is a peripheral component interface (PCI) bus or a PCI Express bus.

9. A computer system configured for uniquely identifying a hardware configuration of a computer system, the computer system comprising:
   one or more central processing units (CPUs);
   one or more graphics processing units (GPUs);
   at least one bus that couples the one or more CPUs to the one or more GPUs; and
   a signature generator configured to:
      gather data from a system management basic input-output system (SMBIOS) device list generated for the computer system;
      probe a bus within the computer system to determine a bus topology and to assign a unique identifier to each device coupled to the bus;
      access configuration space registers of each device coupled to the bus to determine a bus type; and
      compute a signature value for the computer system based on at least the data gathered from the SMBIOS device list, the bus topology, and the bus type wherein the step of computing the signature value comprises passing the data gathered from the SMBIOS device list, the bus topology, and the bus type through a hash function, and wherein the signature value is smaller in size than the data gathered from the SMBIOS device list, the bus topology, and the bus type.

10. The computer system of claim 9, further comprising a firmware module configured to generate the SMBIOS device list.

11. The computer system of claim 9, wherein the bus type reflects the width of the at least one bus, the voltage compatibility of the at least one bus, the speed compatibility of the at least one bus and the version of the at least one bus.

12. The computer system of claim 9, wherein the data gathered from the SMBIOS device list includes a central processing unit (CPU) type.

13. The computer system of claim 9, wherein the data gathered from the SMBIOS device list includes the number of CPUs within the computer system.

14. The computer system of claim 9, wherein the data gathered from the SMBIOS device list includes a graphics processing unit (GPU) type.

15. The computer system of claim 9, wherein the data gathered from the SMBIOS device list includes a network interface card (NIC) type or an advanced configuration power interface level.

16. The computer system of claim 9, wherein the bus is a peripheral component interface (PCI) bus or a PCI Express bus.

17. The computer system of claim 9, wherein the computer system comprises a plurality of buses, and the signature generator is configured to probe each bus in the plurality of buses, and, for each bus, assign a unique identifier to each device coupled to the bus, and access configuration space registers of each device coupled to the bus to determine a bus type.

18. The computer system of claim 17, wherein the signature generator is further configured to generate a signature value for the computer system by passing the data gathered from the SMBIOS list, the bus topology, and the bus type of each bus in the plurality of buses through a hash function, and wherein the signature value is smaller in size than the data gathered from the SMBIOS device list, the bus topology, and the bus type of each bus in the plurality of buses.

* * * * *